United States Patent
Yamada

(10) Patent No.: US 11,396,270 B2
(45) Date of Patent: Jul. 26, 2022

(54) FRONT PASSENGER SEAT AIRBAG DEVICE

(71) Applicant: TOYODA GOSEI CO., LTD., Kiyosu (JP)

(72) Inventor: Ikuo Yamada, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 184 days.

(21) Appl. No.: 16/655,430

(22) Filed: Oct. 17, 2019

(65) Prior Publication Data

US 2020/0122677 A1    Apr. 23, 2020

(30) Foreign Application Priority Data

Oct. 19, 2018    (JP) .............................. JP2018-197653

(51) Int. Cl.
    *B60R 21/205*    (2011.01)
    *B60R 21/233*    (2006.01)
    (Continued)

(52) U.S. Cl.
    CPC ........ *B60R 21/2338* (2013.01); *B60R 21/205* (2013.01); *B60R 21/233* (2013.01);
    (Continued)

(58) Field of Classification Search
    CPC ................ B60R 21/205; B60R 21/233; B60R 2021/0004; B60R 2021/0009; B60R 2021/0048; B60R 2021/23308
    See application file for complete search history.

(56) References Cited

U.S. PATENT DOCUMENTS 7,766,385 B2 *   8/2010   Fukawatase ........ B60R 21/2338
                                                   280/743.2
8,419,053 B2 *   4/2013   Ahn ...................... B60R 21/231
                                                   280/732
(Continued)

FOREIGN PATENT DOCUMENTS

JP    2008-254500 A    10/2008
JP    2016-068611 A    5/2016
(Continued)

OTHER PUBLICATIONS

Office Action dated Nov. 15, 2021 of Japanese Patent Application No. 2018-197653 and English Machine Translation thereof.

*Primary Examiner* — Jonathan Ng
*Assistant Examiner* — Joselynn Y Sliteris
(74) *Attorney, Agent, or Firm* — Posz Law Group, PLC

(57) ABSTRACT

An airbag is configured by six base materials of two side wall configuration panels, a projecting portion configuration panel, a front panel, and two rear panels. Each of the side wall configuration panels configure a left wall portion or a right wall portion facing each other on a side in a rightward-leftward direction in a main body inflation portion, and a projecting portion configuration portion configuring a projecting inflation portion is located in one of the side wall configuration panels. The front panel configures a region from an upper wall portion to a lower wall portion, which face each other on a side in an upward-downward direction in the main body inflation portion. Each of the rear panels configures a rear surface in the main body inflation portion when the main body inflation portion is completely inflated. The projecting portion configuration panel has an external shape substantially coincident with that of the projecting portion configuration portion. The projecting portion configuration panel and the rear panel on the projecting inflation (Continued)

portion side include a recess portion configuration portion configuring a restraining recess portion.

1 Claim, 16 Drawing Sheets

(51) Int. Cl.
  *B60R 21/00* (2006.01)
  *B60R 21/2338* (2011.01)
(52) U.S. Cl.
  CPC ............... *B60R 2021/0004* (2013.01); *B60R 2021/0009* (2013.01); *B60R 2021/0048* (2013.01); *B60R 2021/23308* (2013.01); *B60R 2021/23382* (2013.01)

(56) References Cited

U.S. PATENT DOCUMENTS

| | | | | |
|---|---|---|---|---|
| 9,248,799 | B2 * | 2/2016 | Schneider | B60R 21/26 |
| 9,758,123 | B2 * | 9/2017 | Yamada | B60R 21/2338 |
| 10,183,645 | B2 * | 1/2019 | Rose | B60R 21/01552 |
| 10,351,090 | B2 * | 7/2019 | Yamada | B60R 21/2338 |
| 10,363,895 | B2 * | 7/2019 | Yamada | B60R 21/231 |
| 10,434,969 | B2 * | 10/2019 | Yamada | B60R 21/2338 |
| 10,501,045 | B2 * | 12/2019 | Yamada | B60R 21/2338 |
| 10,661,746 | B2 * | 5/2020 | Yamada | B60R 21/205 |
| 10,682,977 | B2 * | 6/2020 | Maenishi | B60R 21/233 |
| 11,173,867 | B2 * | 11/2021 | Hosoe | B60R 21/2338 |
| 2017/0305380 | A1 | 10/2017 | Tsujimoto et al. | |
| 2018/0056922 | A1 | 3/2018 | Yamada | |
| 2018/0154857 | A1 | 6/2018 | Yamada | |
| 2018/0354450 | A1 * | 12/2018 | Yamada | B60R 21/239 |

FOREIGN PATENT DOCUMENTS

| | | | |
|---|---|---|---|
| JP | 201765395 A | * | 4/2017 |
| JP | 201834558 A | | 3/2018 |
| JP | 2018-094933 A | | 6/2018 |

* cited by examiner

FRONT PASSENGER SEAT AIRBAG DEVICE

CROSS REFERENCE TO RELATED APPLICATIONS

The present application claims priority from Japanese Patent Application No. 2018-197653 of Yamada, filed on Oct. 19, 2018, the entire disclosure of which is incorporated herein by reference.

BACKGROUND

1. Technical Field

The present invention relates to a front passenger seat airbag device including an airbag folded and stored inside a storage area disposed in an instrument panel located in front of an occupant sitting on a front passenger seat, and inflated to project rearward in a vehicle by injecting inflating gas into the airbag.

2. Description of Related Art

In the related art, as an airbag used for a front passenger seat airbag device, JP-A-2016-68611 discloses a configuration as follows. The airbag includes a main body inflation portion in which a front end side that projects when the airbag is completely inflated is attached to a storage area, and a projecting inflation portion located to partially project rearward from at least one end side in a rightward-leftward direction, on a rear surface side of the main body inflation portion that projects when the airbag is completely inflated. The airbag has the following configuration. The main body inflation portion and the projecting inflation portion are formed in such a way that peripheral edges of four pieces of base materials cut into a predetermined shape are joined to one another. However, according to the airbag in the related art, there is a possibility that a head portion of an occupant may not be smoothly protected due to the following reason. For example, at the time of an oblique collision or an offset collision of a vehicle, when the head portion of the occupant moving obliquely forward is received and stopped in the vicinity of a boundary area between the main body inflation portion and the projecting inflation portion, in some cases, the head portion of the occupant may rotate along a horizontal direction by coming into contact with a side surface of the projecting inflation portion configuring the vicinity of the boundary area.

In addition, as the airbag used for the front passenger seat airbag device, JP-A-2018-94933 discloses a configuration as follows. The airbag includes a restraining recess portion for restraining the head portion of the occupant by allowing the head portion of the occupant to enter the restraining recess portion so that a region of the restraining recess portion is recessed forward in the vicinity of the boundary area between the main body inflation portion and the projecting inflation portion.

According to the airbag in the related art, a configuration is adopted as follows. The head portion of the occupant moving obliquely forward can be smoothly protected by allowing the head portion of the occupant to enter the restraining recess portion. However, the airbag is formed in such a way that peripheral edges of eight pieces of base materials cut into a predetermined shape are joined to one another. Therefore, there is room for improvement in that the configuration needs to be simplified to prevent an increase in manufacturing man-hours and costs.

SUMMARY

According to the present invention, there is provided a front passenger seat airbag device having the following configuration.

The front passenger seat airbag device includes an airbag folded and stored inside a storage area disposed in an instrument panel located in front of an occupant sitting on a front passenger seat, and inflated to project rearward in a vehicle by injecting inflating gas into the airbag.

The airbag includes a main body inflation portion in which a front end side that projects when the airbag is completely inflated is attached to the storage area, and a projecting inflation portion located to partially project rearward from at least one end side in a rightward-leftward direction, on a rear surface side of the main body inflation portion that projects when the airbag is completely inflated, and a rear side region that projects when the airbag is completely inflated is configured to serve as an occupant protector capable of protecting the occupant.

The occupant protector includes a frontal collision restraint surface configured by a region on the rear surface side of the main body inflation portion that projects when the airbag is completely inflated, and capable of protecting a head portion of the occupant moving forward at the time of a frontal collision of the vehicle, an oblique collision restraint surface configured by a side wall formed in the projecting inflation portion so as to be continuous from a rear surface of the main body inflation portion, and capable of protecting the head portion of the occupant moving obliquely forward at the time of an oblique collision or an offset collision of the vehicle, and a restraining recess portion formed to be recessed forward in order to restrain the head portion of the occupant by allowing the head portion of the occupant to enter between the frontal collision restraint surface and the oblique collision restraint surface.

The airbag is formed into a bag shape in such a way that peripheral edges of base materials formed of a flexible sheet body having a predetermined shape are joined to one another. The base material is configured by at least six pieces of two side wall configuration panels, a projecting portion configuration panel, a front panel, and two rear panels.

The side wall configuration panel configures a left wall portion or a right wall portion facing each other on a side in the rightward-leftward direction in the main body inflation portion that projects when the airbag is completely inflated, and at least one of which is configured so that a projecting portion configuration portion configuring the projecting inflation portion is located by being partially extended rearward.

The front panel configures the upper wall portion to the lower wall portion which face on a side in an upward-downward direction in the main body inflation portion that projects when the airbag is completely inflated, to include a front edge side area linking an upper wall portion and a lower wall portion with each other.

Each of the rear panels configures a rear surface in the main body inflation portion that projects when the airbag is completely inflated, and is configured to be divided into two pieces on the side in the rightward-leftward direction.

The projecting portion configuration panel configures the oblique collision restraint surface side in the projecting inflation portion, and is configured to have an external shape substantially coincident with that of the projecting portion configuration portion formed in one of the side wall configuration panels.

The projecting portion configuration panel and the rear panel located on the projecting inflation portion side include a recess portion configuration portion configuring a facing surface of the restraining recess portion.

DETAILED DESCRIPTION OF THE INVENTION

Exemplary embodiments are described below with reference to the accompanying drawings. However, the invention is not limited to the embodiments disclosed herein. All modifications within the appended claims and equivalents relative thereto are intended to be encompassed in the scope of the claims.

Hereinafter, an embodiment according to the present invention will be described with reference to the drawings.

Figure 5:
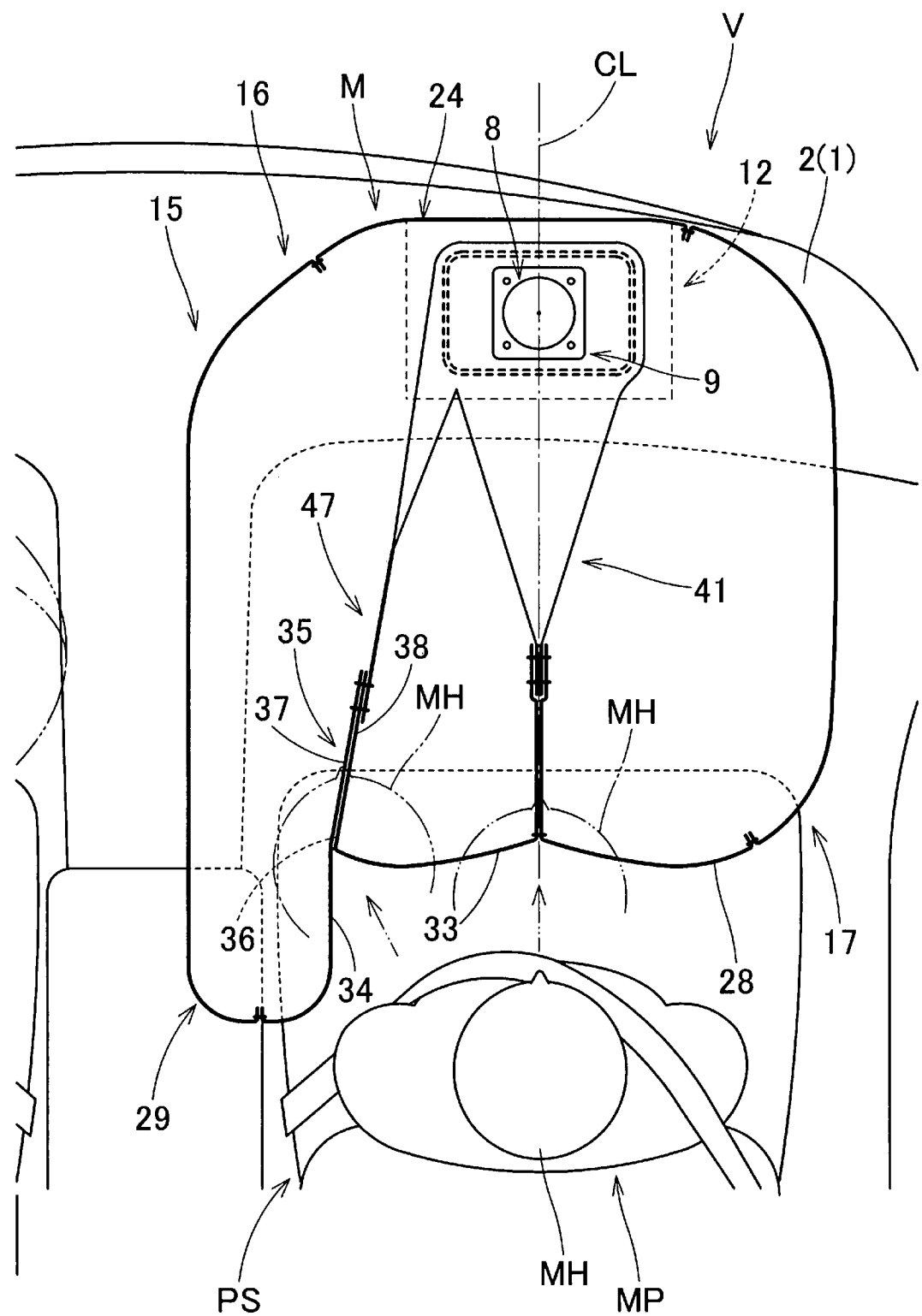
FIG. 5 is a schematic longitudinal sectional view illustrating a state where the airbag is completely inflated in the front passenger seat airbag device according to the embodiment.

As illustrated in FIG. 5, a front passenger seat airbag device M (hereinafter, simply referred to as an "airbag device") according to the embodiment is located inside an instrument panel 1 in front of a front passenger seat PS in a vehicle V which is a left-hand drive vehicle in which the front passenger seat PS is located on a right side. Unless otherwise specified in the embodiment, forward-rearward, upward-downward, and rightward-leftward directions coincide with forward-rearward, upward-downward, and rightward-leftward directions of the vehicle V.

As illustrated in FIG. 5, the airbag device M according to the embodiment includes an airbag 15, an inflator 8 that supplies inflating gas to the airbag 15, a case 12 serving as a storage area for storing and holding the airbag 15 and the inflator 8, and a retainer 9 for attaching the airbag 15 and the inflator 8 to the case 12. In addition, although details are omitted in the illustration, the airbag device M includes an airbag cover that covers an upper portion of the folded airbag 15, and that has a door portion which can be opened when the airbag 15 is expansively inflated. According to the embodiment, the inflator 8 is configured to be operated at the time of a frontal collision, oblique collision, and offset collision of the vehicle V.

Figure 1:
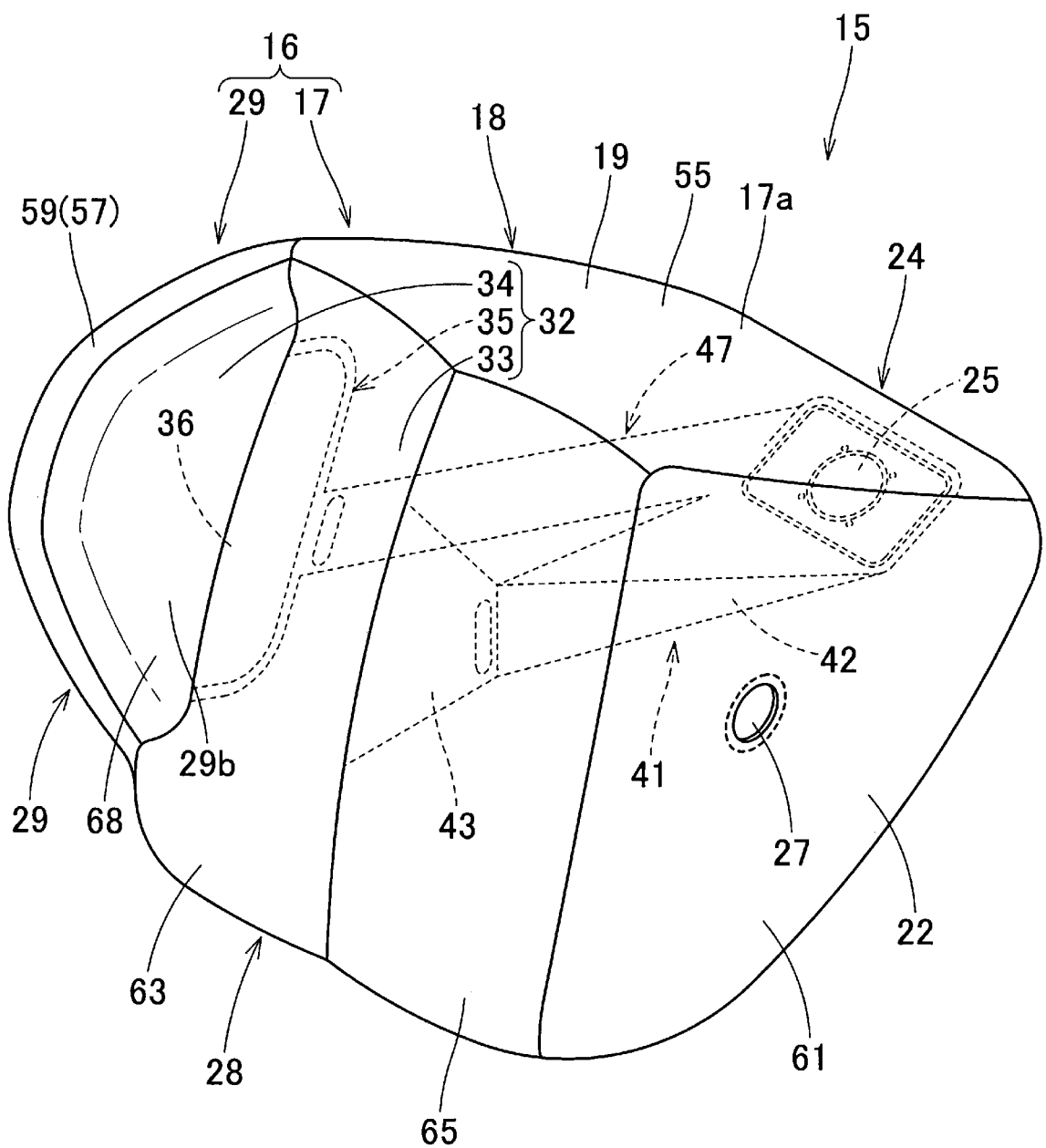
FIG. 1 is a perspective view illustrating a state where an airbag used for a front passenger seat airbag device according to an embodiment of the present invention is inflated alone viewed from an obliquely right rear side.
Figure 2:
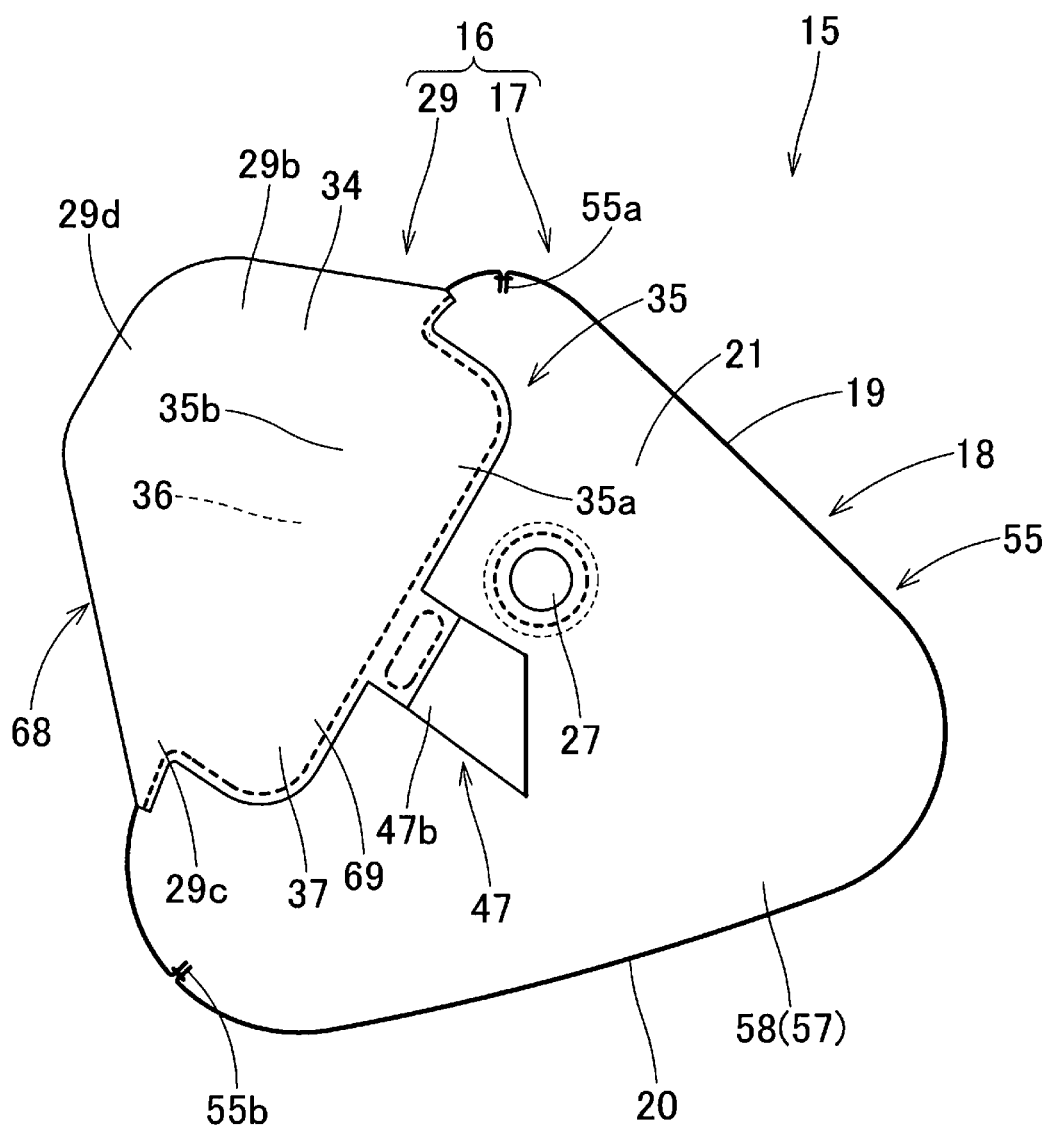
FIG. 2 is a schematic vertical sectional view of the airbag in FIG. 1, and a sectional view illustrating an area of a restraining recess portion.
Figure 3:
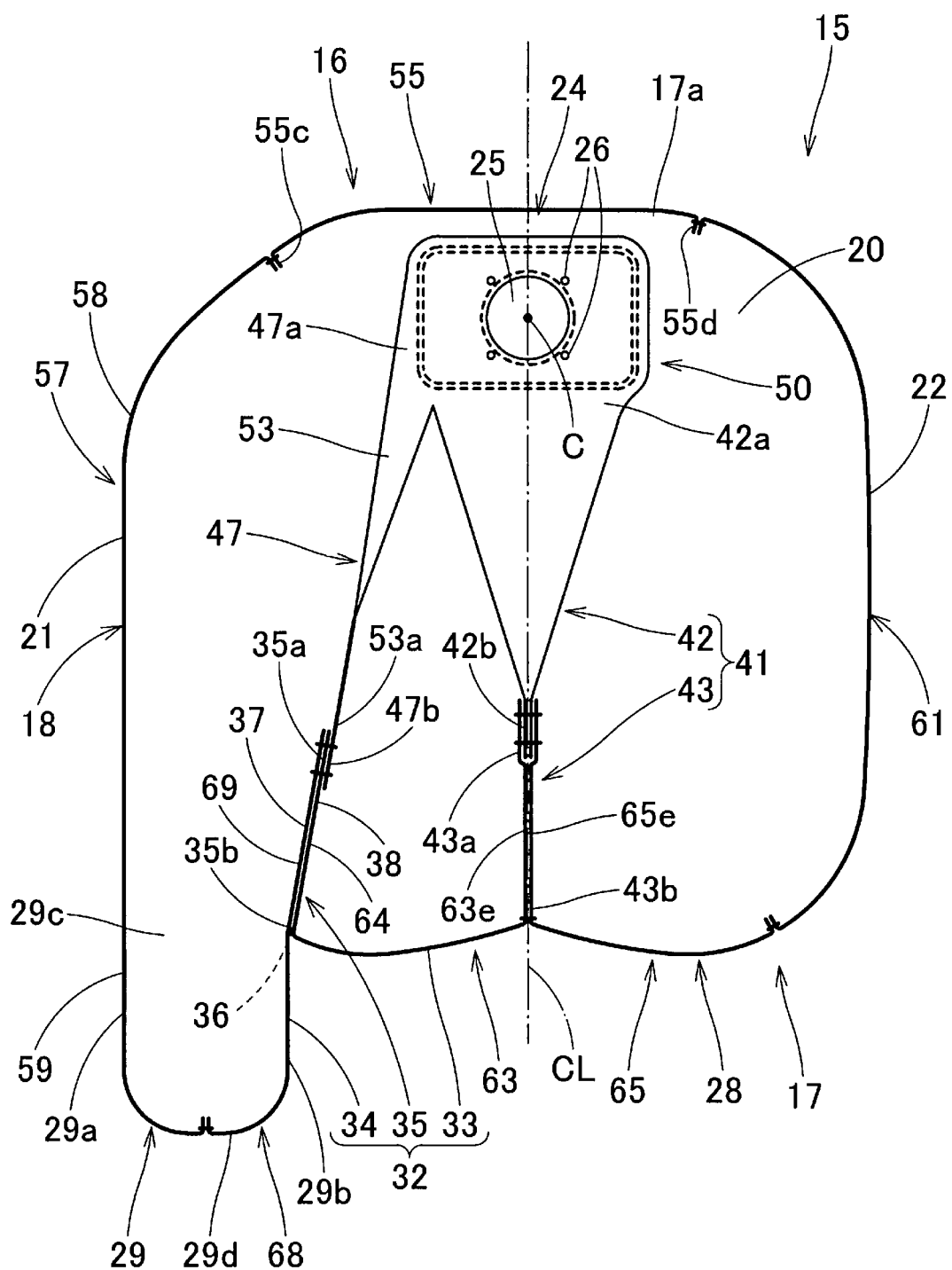
FIG. 3 is a schematic longitudinal sectional view of the airbag in FIG. 1.

As illustrated in FIGS. 1 to 3, the airbag 15 includes a bag main body 16 inflated by injecting the inflating gas into the bag main body 16, and tethers 41 and 47 located inside the bag main body 16 so as to regulate a completely inflated shape of the bag main body 16.

The bag main body 16 has a bag shape formed of a flexible sheet body. In the embodiment, as illustrated in FIGS. 1 to 3, the bag main body 16 includes a main body inflation portion 17 and a projecting inflation portion 29 located so as to partially project from a rear surface side of the main body inflation portion 17 when the main body inflation portion 17 is completely inflated.

The main body inflation portion 17 is located between the instrument panel 1 and a window shield (not illustrated) when the main body inflation portion 17 is completely inflated. As illustrated in FIG. 1, a completely inflated shape of the main body inflation portion 17 is a substantially triangular prism shape in which an axial direction substantially extends along the rightward-leftward direction. The main body inflation portion 17 includes an attachment portion 24 attached to the case 12 on a front end side that projects when the main body inflation portion 17 is completely inflated (refer to FIGS. 1 and 3). That is, in the airbag 15 according to the embodiment, the main body inflation portion 17 is attached to the case 12 on a front end 17a side that projects when the main body inflation portion 17 is completely inflated. As illustrated in FIG. 3, the main body inflation portion 17 is configured to be located so that a left side region slightly projects to a left side which is a driver's seat side when the main body inflation portion 17 is completely inflated. The main body inflation portion 17 includes a rear side wall portion 28 located on a rear surface side which is an occupant MP side when the main body inflation portion 17 is completely inflated, and a peripheral wall portion 18 which extends forward from a peripheral edge of the rear side wall portion 28 and which has a tapered shape converging to reduce upper and lower width dimensions over the front end 17a side.

The peripheral wall portion 18 is an area mainly located between the instrument panel 1 and a window shield (not illustrated) when the airbag 15 is completely inflated, and includes an upper wall portion 19 and a lower wall portion 20 which are located to face on a side in the upward-downward direction, and a left wall portion 21 and a right wall portion 22 which are located to face each other on a side in the rightward-leftward direction. In the airbag 15 according to the embodiment, a front end side area in the peripheral wall portion 18 that projects when the airbag 15 is completely inflated is the attachment portion 24 for attaching the airbag 15 to the case 12. The attachment portion 24 is set so that a width dimension on a side in the rightward-leftward direction when the airbag 15 is completely inflated is larger than a width dimension on a side in the rightward-leftward direction of the case 12 (refer to FIG. 5). A lower surface side (lower wall portion 20 side) in the attachment portion 24 that projects when the airbag is completely inflated has a gas inlet 25 formed to be open in a substantially circular shape so that the inflating gas can be injected into the gas inlet 25, and a plurality of (four in the embodiment) attachment holes 26 for inserting a bolt (not illustrated) of the retainer 9 in a peripheral edge of the gas inlet 25. Then, the airbag 15 is attached to the case 12 in an area of the attachment portion 24 by attaching the peripheral edge of the gas inlet 25 to the case 12 by using the retainer 9. In the embodiment, the gas inlet 25 is located at a position slightly shifted rightward from a center in the rightward-leftward direction of the attachment portion 24. Accordingly, the airbag 15 is attached to the case 12 so that the center of the gas inlet 25 is set as an attachment center C (refer to FIG. 3), and the attachment center C is set to substantially coincide with the center of the front passenger seat PS in the rightward-leftward direction. In this manner, the airbag 15 is mounted on the vehicle V (refer to FIG. 5). In addition, the left wall portion 21 and the right wall portion 22 in the peripheral wall portion 18 have a vent hole 27 for exhausting the surplus inflating gas flowing into the airbag 15.

The rear side wall portion 28 is located substantially along the upward-downward direction on the rear surface side which is the occupant MP side when the airbag 15 is completely inflated. The projecting inflation portion 29 inflated to partially project rearward is located in a left end side area which is the driver's seat side.

The projecting inflation portion 29 is located at an obliquely left front position of the occupant MP sitting on the front passenger seat PS when the airbag 15 is completely inflated (refer to FIG. 5). The projecting inflation portion 29 communicates with the main body inflation portion 17 on a front end 29c side that projects when the projecting inflation portion 29 is completely inflated, so that the inflating gas is injected into the projecting inflation portion 29 through the main body inflation portion 17 (refer to FIG. 3). The projecting inflation portion 29 has a substantially trapezoidal shape as an external shape obtained when the projecting inflation portion 29 is completely inflated when viewed from the side in the rightward-leftward direction so that a thickness direction is a substantially plate-like shape located along the rightward-leftward direction. Specifically, the projecting inflation portion 29 has a trapezoidal shape whose width is narrowed toward a rear end 29d side so that a completely inflated shape when viewed from the side in the rightward-leftward direction has a widened width toward the front end 29c side which is the main body inflation portion 17 side (refer to FIG. 2). The projecting inflation portion 29 includes a left wall portion 29a and a right wall portion 29b which are located to face each other on the side in the rightward-leftward direction when the projecting inflation portion 29 is completely inflated. As illustrated in FIG. 3, the left wall portion 29a is configured to be continuous from the left wall portion 21 of the peripheral wall portion 18 in the main body inflation portion 17. Outer dimensions of the projecting inflation portion 29 (width dimension on the side in the upward-downward direction and width dimension on the side in the forward-rearward direction (projecting amount from the rear side wall portion 28)) are set to the following dimensions. According to the dimensions, when the airbag 15 is completely inflated, and when a head portion MH of the occupant MP moving obliquely forward is brought into contact with the right wall portion 29b (oblique collision restraint surface 34 to be described later), the head portion MH of the occupant MP can be smoothly guided toward a restraining recess portion 35.

The airbag 15 according to the embodiment is configured so that a rear side region that projects when the airbag 15 is completely inflated serves as an occupant protector 32 which can protect the occupant MP. Specifically, the projecting inflation portion 29 and the rear side wall portion 28 in the main body inflation portion 17 configure the occupant protector 32. The occupant protector 32 includes a frontal collision restraint surface 33 which can protect the head portion MH of the occupant MP moving forward at the time of a frontal collision of the vehicle V, the oblique collision restraint surface 34 which can protect the head portion MH of the occupant MP moving obliquely forward at the time of an oblique collision or an offset collision of the vehicle V, and the restraining recess portion 35 located between the frontal collision restraint surface 33 and the oblique collision restraint surface 34 so as to restrain the head portion MH of the occupant MP by allowing the head portion MH of the occupant MP to enter therebetween.

In the embodiment, the frontal collision restraint surface 33 is configured by an upper side region of the rear side wall portion 28, and is configured by a region located on the right side of the projecting inflation portion 29 in the rear side wall portion 28 when the airbag 15 is completely inflated. That is, the frontal collision restraint surface 33 includes a region extending to the left side (driver's seat side) and the right side (side away from the driver's seat) from a center line CL along the forward-rearward direction passing through the attachment center C. (Refer to FIG. 3), and is configured to be capable of protecting the head portion MH of the occupant MP moving forward at the time of a frontal collision without any trouble. In the embodiment, the frontal collision restraint surface 33 is configured so that the center periphery in the rightward-leftward direction on the center line CL is slightly recessed forward in a cross section substantially along the forward-rearward direction, when the airbag 15 is completely inflated (refer to FIG. 3).

The oblique collision restraint surface 34 is configured by the right wall portion 29b of the projecting inflation portion 29. That is, the oblique collision restraint surface 34 is formed to project rearward from the frontal collision restraint surface 33. In the embodiment, the oblique collision restraint surface 34 is located only on the left side which is a driver's seat DS side of the frontal collision restraint surface 33. The oblique collision restraint surface 34 is located substantially along the forward-rearward direction when the airbag 15 is completely inflated. In addition, in the airbag 15 according to the embodiment, the lower side region in the rear side wall portion 28 mainly receives and stops a chest portion of the occupant MP when the head portion MH of the occupant MP is restrained by the occupant protector 32 in moving forward at the time of a frontal collision, an oblique collision, and an offset collision.

The restraining recess portion 35 formed between the frontal collision restraint surface 33 and the oblique collision restraint surface 34 is provided for restraining the head portion MH of the occupant MP by allowing the head portion MH of the occupant MP to enter therebetween. In the embodiment, the restraining recess portion 35 is formed substantially along the upward-downward direction in a boundary area between the right side region of the projecting inflation portion 29 and the rear side wall portion 28 in the main body inflation portion 17. As illustrated in FIGS. 2 and 3, the restraining recess portion 35 is configured so that a rear end 35b side is open and recessed forward in a pocket shape. When viewed from the side in the rightward-leftward direction, upper edges, lower edges, and front edges of a left side wall 37 and a right side wall 38 which have a substantially rectangular shape widened in the upward-downward direction are joined (sewn) to each other. In this manner, the restraining recess portion 35 is configured to have a substantially pocket shape in which the rear end 35b side is open. (refer to FIGS. 2 and 3). That is, the restraining recess portion 35 includes the left side wall 37 and the right side wall 38 which face each other on the side in the rightward-leftward direction. The restraining recess portion 35 is set so that a length dimension (opening width dimension of an opening) on the side in the upward-downward direction enables the head portion MH of the occupant MP to smoothly enter the restraining recess portion 35. The restraining recess portion 35 is set so that a width dimension (depth) on the side in the forward-rearward direction enables the front side region of the head portion MH of the occupant MP to enter the restraining recess portion 35.

In addition, in the airbag 15 according to the embodiment, a tip side (front end 35a side) of a recess in the restraining recess portion 35 is linked to the recess portion tether 47 located inside the bag main body 16. The restraining recess portion 35 is located in a state where the tip (front end 35a side) of the recess is pulled forward by the recess portion tether 47 when the airbag 15 is completely inflated (refer to FIGS. 1 and 3). In the embodiment, the restraining recess portion 35 is located to be slightly inclined with respect to the forward-rearward direction as follows. In a state where an opening 36 on the rear end 35b side is prevented from being open so that the left side wall 37 and the right side wall 38 come into contact with each other over substantially the entire area when the airbag 15 is completely inflated, the front end 35a is directed rightward while being continuous from the right wall portion 29b of the projecting inflation portion 29 (refer to FIG. 3).

The tethers 41 and 47 for regulating a completely inflated shape of the bag main body 16 are located inside the bag main body 16. Specifically, as illustrated in FIGS. 1 to 3, a forward-rearward tether 41 and a recess portion tether 47 are located inside the region of the main body inflation portion 17.

The forward-rearward tether 41 links substantially the center of the frontal collision restraint surface 33 in the rightward-leftward direction and the front end 17a side of the airbag 15 (main body inflation portion 17) with each other. As illustrated in FIG. 3, the forward-rearward tether 41 is located on the center line CL when the airbag 15 is completely inflated. The forward-rearward tether 41 is configured to link a front side area 42 extending from the peripheral edge of the gas inlet 25 and a rear side area 43 extending from the rear side wall portion 28 side with each other.

Figure 4:
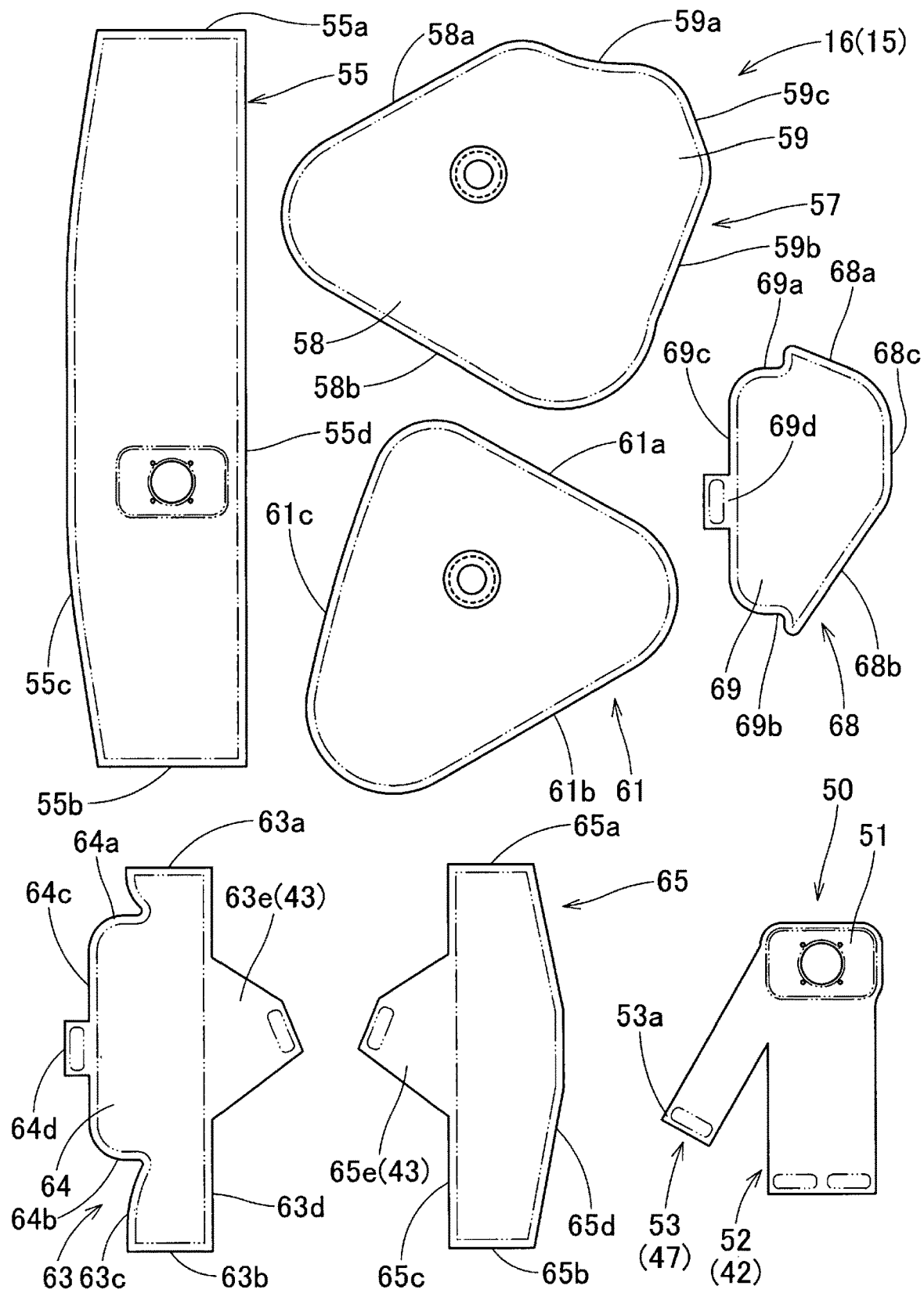
FIG. 4 is a plan view illustrating a base fabric configuring the airbag in FIG. 1.

In the embodiment, the front side area 42 is configured by a tether base fabric 50 shown in FIG. 4 together with the recess portion tether 47. The tether base fabric 50 includes a linkage portion 51 linked with the peripheral edge of the gas inlet 25 to be shared together, a belt-shaped front side area base material 52 extending rearward from the linkage portion 51 and configuring the front side area 42, and a belt-shaped portion 53 extending obliquely leftward and rearward from the linkage portion 51 and configuring the recess portion tether 47. Then, the front side area 42 is formed by folding the front side area base material 52 having a belt shape. An external shape of the front side area 42 obtained when the bag main body 16 is completely inflated is a three-dimensional shape approximated to a substantially triangular pyramid shape so that the front end 42a side extends substantially along the rightward-leftward direction and the rear end 42b side extends substantially along the upward-downward direction.

The linkage portion 51 of the tether base fabric 50 has openings (numeral omitted) corresponding to the gas inlet 25 and the attachment holes 26, and is sewn to an area on the lower surface side of the attachment portion 24 in the main body inflation portion 17 in the peripheral edge area of the gas inlet 25.

In the embodiment, the rear side area 43 extends in a sheet shape from substantially the center in the rightward-leftward direction of the rear side wall portion 28 in the main body inflation portion 17. The rear side area 43 has a substantially trapezoidal external shape so that a front end 43a side linked with the front side area 42 is narrowed and a rear end 43b side linked with the rear side wall portion 28 is widened in the upward-downward direction. In the rear side area 43, the rear end 43b side is linked with a substantially center position of the rear side wall portion 28 in the upward-downward and rightward-leftward directions. In the embodiment, the rear side area 43 is formed from extension portions 63e and 65e formed to respectively extend from a right edge 63d of a rear panel 63 and a left edge 65c of a rear panel 65 (to be described later) (refer to FIG. 4). That is, as illustrated in FIG. 3, the rear side area 43 has a two-layered shape in which two panels overlap each other on the side in the rightward-leftward direction.

The forward-rearward tether 41 links substantially the center of the rear side wall portion 28 in the rightward-leftward direction when the airbag 15 is completely inflated, that is, substantially the center of the frontal collision restraint surface 33 in the rightward-leftward direction, and a peripheral edge area (front end 17a side of the main body inflation portion 17) of the gas inlet 25 with each other. The forward-rearward tether 41 is located in order to prevent the frontal collision restraint surface 33 from excessively projecting rearward in an initial state where the airbag 15 is inflated, or to prevent the frontal collision restraint surface 33 from moving rearward when the airbag 15 is completely inflated. In addition, according to the embodiment, the rear side wall portion 28 is pulled by the forward-rearward tether 41, and is located so that the position on the center line CL is slightly recessed forward in the vehicle over substantially the entire area in the upward-downward direction when the airbag 15 is completely inflated (refer to FIG. 3).

As illustrated in FIGS. 1 and 3, the recess portion tether 47 is located so as to link the tip (front end 35a) side of the recess in the restraining recess portion 35 and the front end side (front end 17a side of the main body inflation portion 17) of the airbag 15 with each other, when the airbag 15 is completely inflated. The recess portion tether 47 is configured by the belt-shaped portion 53 of the tether base fabric 50 as described above. The recess portion tether 47 links a rear end 53a side of the belt-shaped portion 53 with the front end 35a side of the restraining recess portion 35. In this manner, the recess portion tether 47 is located to be inclined with respect to the forward-rearward direction so that a front end 47a side is positioned rightward and a rear end 47b side is positioned leftward when the airbag 15 is completely inflated (refer to FIG. 3). A length dimension of the recess portion tether 47 is set to a dimension which can pull the restraining recess portion 35 forward so that the restraining recess portion 35 extends approximately along the recess portion tether 47 when the airbag 15 is completely inflated.

The bag main body 16 is formed in a bag shape by joining the peripheral edges of the base fabrics having a predetermined shape. In the embodiment, as illustrated in FIG. 4, the bag main body 16 is configured by six base fabrics of two side wall configuration panels 57 and 61, a projecting portion configuration panel 68, a front panel 55, and two rear panels 63 and 65.

The front panel 55 is configured to have a substantially belt-like shape whose external shape is formed so that the longitudinal direction extends substantially along the forward-rearward direction. The front panel 55 configures the upper wall portion 19 to the lower wall portion 20 which face each other on the side in the upward-downward direction in the main body inflation portion 17, when the main body inflation portion 17 is completely inflated, to include the area on the front edge side linking the upper wall portion 19 and the lower wall portion 20 with each other. In the embodiment, the front panel 55 is configured to have a laterally asymmetric shape so that a left edge 55c side protrudes leftward.

The two side wall configuration panels 57 and 61 configure the left wall portion 21 or the right wall portion 22 which face each other on the side in the rightward-leftward direction in the main body inflation portion 17. A projecting portion configuration portion 59 configuring the projecting inflation portion 29 is located by partially extending rearward in the side wall configuration panel 57 configuring the left wall portion 21. That is, the side wall configuration panel 57 on the left side configures an area from the left wall portion 21 in the main body inflation portion 17 that projects when completely inflated to the left wall portion 29a in the projecting inflation portion 29. Specifically, as illustrated in FIG. 4, the side wall configuration panel 57 links the substantially trapezoidal-shaped projecting portion configuration portion 59 configuring the left wall portion 29a of the projecting inflation portion 29 with the rear end side of a substantially triangular-shaped main body portion 58 configuring the region of the left wall portion 21 of the main body inflation portion 17. The side wall configuration panel 61 on the right side configures the right wall portion 22 of the main body inflation portion 17, and has a substantially triangular external shape which is substantially the same as the external shape of the main body portion 58 in the side wall configuration panel 57.

The two rear panels 63 and 65 configure the rear surface in the main body inflation portion 17 that projects when completely inflated, and are configured to be divided into two pieces on the side in the rightward-leftward direction. That is, the area of the rear side wall portion 28 is divided into right and left areas. Each of the rear panels 63 and 65 has a belt shape whose longitudinal direction extends substantially along the upward-downward direction. The extension portion 63e forming the rear side area 43 of the forward-rearward tether 41 is formed to project in the right edge 63d of the rear panel 63. The extension portion 65e forming the rear side area 43 of the forward-rearward tether 41 is formed to project in the left edge 65c of the rear panel 65. A recess portion configuration portion 64 configuring the right side wall 38 of the restraining recess portion 35 is formed to partially project on the upper end side of a left edge 63c of the rear panel 63 located on the left side which is the projecting inflation portion 29 side. A linking tab 64d for linking the rear end 47b of the recess portion tether 47 is formed to project in a front edge 64c of the recess portion configuration portion 64.

The projecting portion configuration panel 68 configures the oblique collision restraint surface 34 side in the projecting inflation portion 29, that is, the area of the right wall portion 29b, and has a substantially trapezoidal external shape which is substantially the same as that of the projecting portion configuration portion 59 formed in the side wall configuration panel 57. In addition, a recess portion configuration portion 69 configuring the left side wall 37 of the restraining recess portion 35 is formed to project on the front edge side of the projecting portion configuration panel 68. A linking tab 69d for linking the rear end 47b of the recess portion tether 47 is formed to project in a front edge 69c of the recess portion configuration portion 69.

In the embodiment, the front panel 55, the side wall configuration panels 57 and 61, the rear panels 63 and 65, and the projecting portion configuration panel 68 which configure the bag main body 16, and the tether base fabric 50 configuring the forward-rearward tether 41 and the recess portion tether 47 are respectively formed of a flexible woven fabric made of polyester yarn or polyamide yarn.

Then, the bag main body 16 according to the embodiment is formed into a bag shape as follows. As illustrated in FIGS. 2 to 4, edge portions corresponding to the front panel 55, the side wall configuration panels 57 and 61, the rear panels 63 and 65, and the projecting portion configuration panel 68 are sewn (joined) together using sutures. Specifically, a rear upper edge 55a of the front panel 55 is joined to upper edges 63a and 65a of the rear panels 63 and 65. A rear lower edge 55b of the front panel 55 is joined to lower edges 63b and 65b of the rear panels 63 and 65. The left edge 55c of the front panel 55 is joined from an upper edge 58a to a lower edge 58b of the main body portion 58 in the side wall configuration panel 57. A right edge 55d of the front panel 55 is joined from an upper edge 61a to a lower edge 61b of the side wall configuration panel 61. The left edge 63c of the rear panel 63 is joined to a rear edge 58c of the main body portion 58 in the side wall configuration panel 57. The right edge 63d of the rear panel 63 is joined to the left edge 65c of the rear panel 65. A right edge 65d of the rear panel 65 is joined to a rear edge 61c of the side wall configuration panel 61. An upper edge 59a, a lower edge 59b, and a rear edge 59c of the projecting portion configuration portion 59 in the side wall configuration panel 57 are respectively joined to an upper edge 68a, a lower edge 68b, and a rear edge 68c of the projecting portion configuration panel 68. An upper edge 64a, a lower edge 64b, and the front edge 64c of the recess portion configuration portion 64 formed in the rear panel 63 are respectively joined to an upper edge 69a, a lower edge 69b, and the front edge 69c of the recess portion configuration portion 69 in the projecting portion configuration panel 68.

The front passenger seat airbag device M of this embodiment can be mounted on the vehicle V as follows. First, the airbag 15 internally storing the retainer 9 is folded so that the airbag 15 can be stored inside the case 12, and is stored inside the case 12 in a state where the periphery of the airbag 15 is wrapped using a breakable wrapping sheet (not illustrated). The retainer 9 is used to link the inflator 8 to the case 12 together with the peripheral edge of the gas inlet 25 of the airbag 15. Thereafter, if the case 12 holding the folded airbag 15 and the inflator 8 is linked with an airbag cover (not illustrated) formed in the instrument panel 1 mounted on the vehicle V, the airbag device M can be mounted on the vehicle V.

In a state where the front passenger seat airbag device M according to the embodiment is mounted on the vehicle V, the inflator 8 is operated at the time of a frontal collision, an oblique collision, or an offset collision of the vehicle V. Then, when the inflator 8 is operated, the airbag 15 is inflated by injecting the inflating gas into the airbag 15. While the airbag 15 projects from the case 12, the airbag 15 is completely inflated as illustrated in FIG. 5.

Then, in the front passenger seat airbag device M according to the embodiment, the airbag 15 is formed by joining the peripheral edges of the six base materials of the front panel 55, the side wall configuration panels 57 and 61, the rear panels 63 and 65, and the projecting portion configuration panel 68. Therefore, compared to the airbag in the related art, the airbag having a simple configuration can be manufactured by preventing an increase in man-hours and costs. In addition, in the front passenger seat airbag device M according to the embodiment, the airbag 15 has the restraining recess portion 35 recessed forward between the frontal collision restraint surface 33 and the oblique collision restraint surface 34. Therefore, at the time of an oblique collision or an offset collision of the vehicle V, while the head portion MH of the occupant MP moving obliquely forward is received and stopped by the oblique collision restraint surface 34, the head portion MH of the occupant MP is allowed to enter the inside of the restraining recess portion 35. In this manner, the head portion MH of the occupant MP can be accurately protected.

Therefore, in the front passenger seat airbag device M according to the embodiment, the head portion MH of the occupant MP moving obliquely forward can be smoothly protected, and a simple configuration can be achieved.

Figure 6:
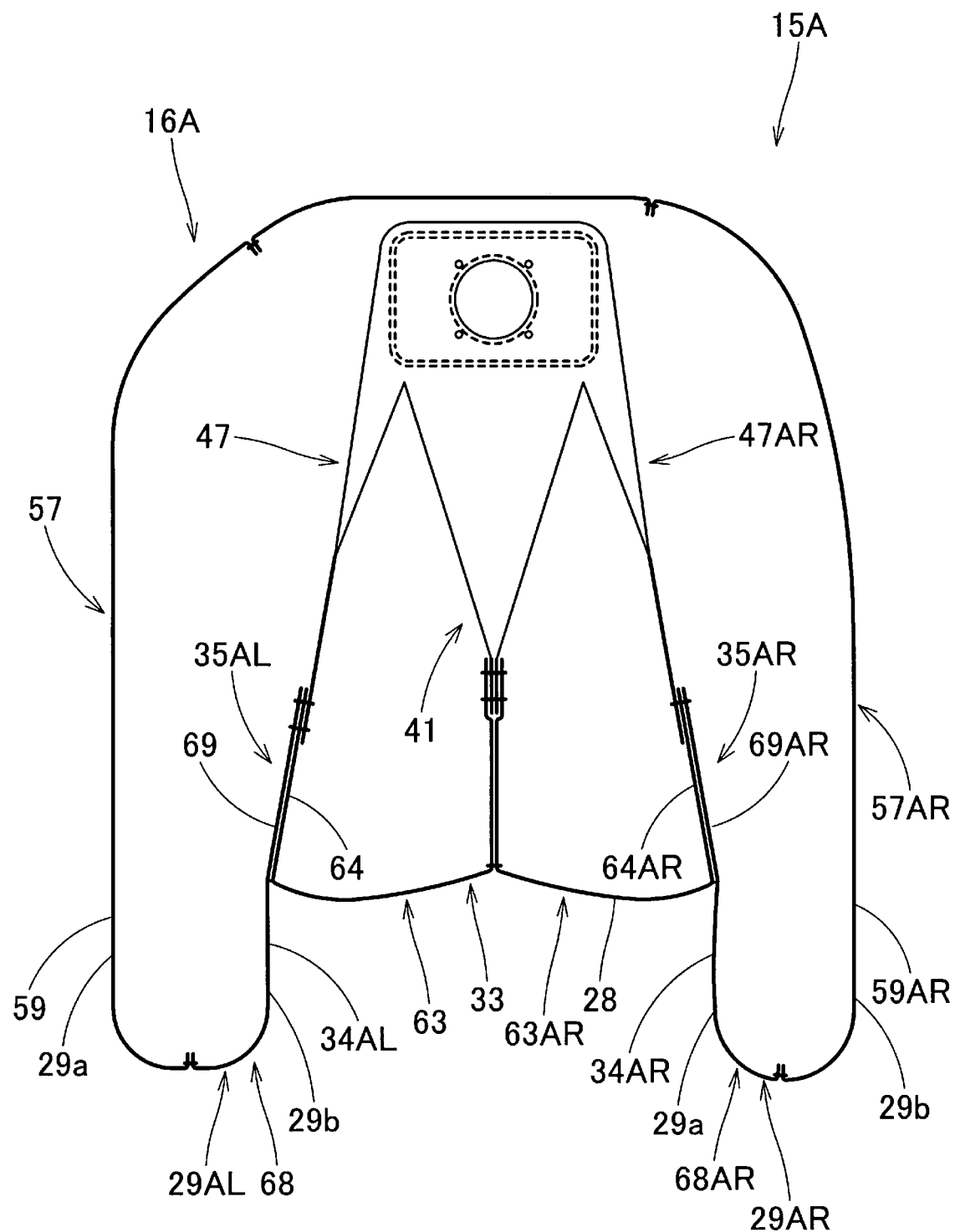
FIG. 6 is a schematic longitudinal sectional view illustrating a state where an airbag according to another embodiment of the present invention is inflated alone.
Figure 8:
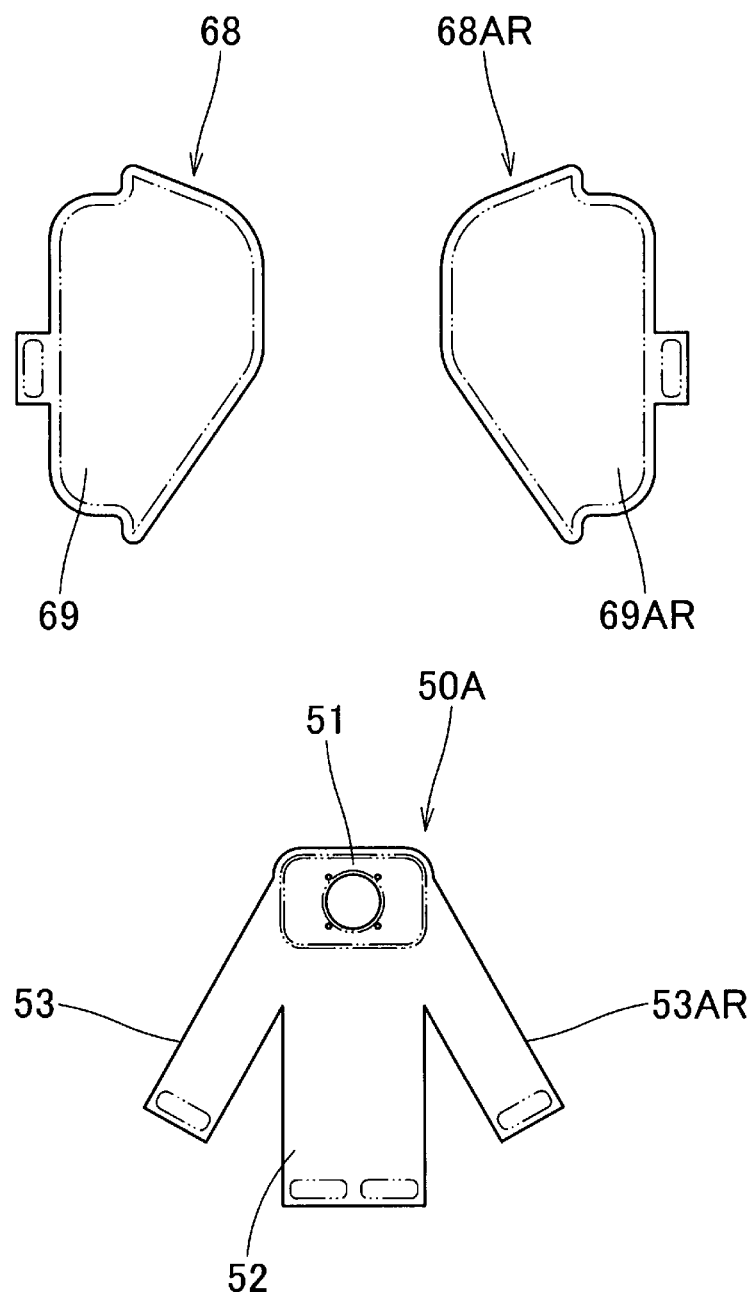

In addition, as illustrated in FIG. 6, an airbag 15A may adopt a configuration in which projecting inflation portions 29AL and 29AR are caused to project from both right and left end sides on the rear surface side of the main body inflation portion 17. In the airbag 15A, an oblique collision restraint surface 34AR configured by the left wall portion 29a of the projecting inflation portion 29AL is also located on the right side of the frontal collision restraint surface 33, and a restraining recess portion 35AR is also formed between the oblique collision restraint surface 34AR and the frontal collision restraint surface 33. Then, a recess portion tether 47AR for linking the tip (front end 35a) side of a recess of the restraining recess portion 35AR on the right side and the front end side (front end 17a side of the main body inflation portion 17) of the airbag 15A with each other is located inside a bag main body 16A. As illustrated in FIG. 8, a tether base fabric 50A used for the airbag 15A also includes a belt-shaped portion 53AR configuring the recess portion tether 47AR.

Figure 7:
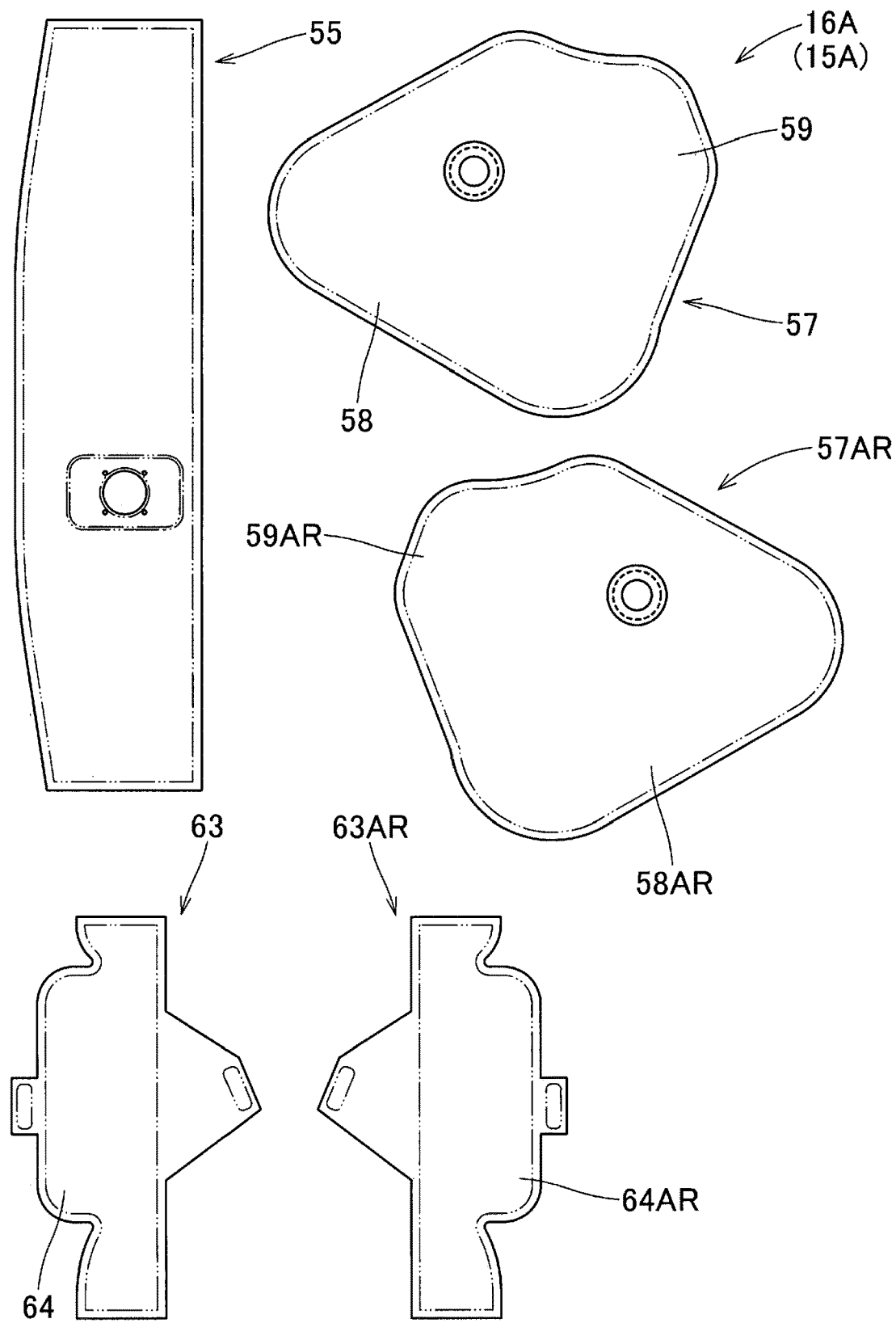
FIGS. 7 and 8 are plan views illustrating a base fabric configuring the airbag in
FIG. 6.

As illustrated in FIGS. 7 and 8, the bag main body 16A is configured by seven base fabrics of two side wall configuration panels 57 and 57AR, two projecting portion configuration panels 68 and 68AR, the front panel 55, and two rear panels 63 and 63AR. The side wall configuration panel 57AR is laterally symmetrical with the side wall configuration panel 57, as a configuration having a main body portion 58AR and a projecting portion configuration portion 59AR. The projecting portion configuration panel 68AR is laterally symmetrical with the projecting portion configuration panel 68. The rear panel 63AR configuring the right side region of the rear side wall portion 28 is laterally symmetrical with the rear panel 63, and includes a recess portion configuration portion 64AR.

If the airbag 15A is configured in this way, in a case where the head portion of the occupant moves obliquely leftward and forward or in a case where the head portion of the occupant moves obliquely rightward and forward, the head portion of the occupant can be accurately protected by oblique collision restraint surfaces 34AL and 34AR and restraining recess portions 35AL and 35AR. In addition, in a case where the airbag 15A has this configuration, the side wall configuration panels 57 and 57AR on both right and left sides may be configured to respectively have the projecting portion configuration portions 59 and 59AR, and the projecting portion configuration panels 68 and 68AR may be configured to employ two pieces corresponding to the projecting portion configuration portions 59 and 59AR. That is, the airbag 15A can be manufactured by joining peripheral edges of a total of seven base materials of the two side wall configuration panels 57 and 57AR, the two projecting portion configuration panels 68 and 68AR, the front panel 55, and the two rear panels 63 and 63AR. In other words, if the airbag 15 having the projecting inflation portion 29 only on one side has a basic six-piece configuration as described above, the airbag 15A having a configuration in which the projecting inflation portions 29AL and 29AR are located on both sides can be easily manufactured by changing a shape of the remaining base fabric as a seven-piece configuration having one more additional projecting portion configuration panel 68AR. Therefore, a basic form (shape) having the six-piece configuration can be easily applied to the seven-piece configuration.

Figure 9:
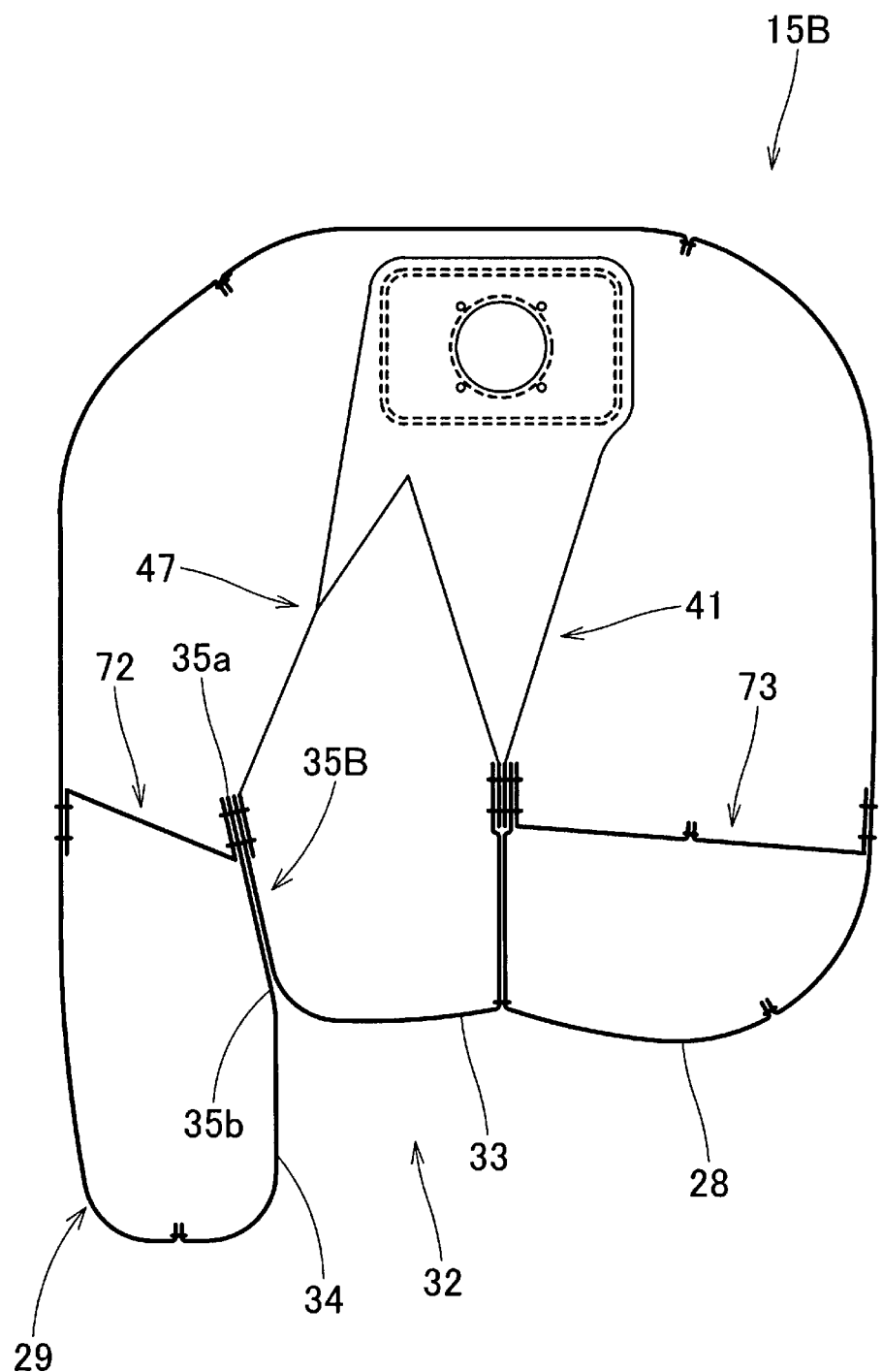
FIG. 9 is a schematic longitudinal sectional view illustrating a state where an airbag according to still another embodiment of the present invention is inflated alone.

In addition, as illustrated in FIG. 9, a configuration for an airbag 15B may be adopted as follows. An auxiliary tether 72 extending leftward from the tip (front end 35a) of a recess of a restraining recess portion 35B and linked with the left wall portion 21 is added to the recess portion tether 47 located inside the bag main body 16. The restraining recess portion 35B that projects when the bag main body 16 is completely inflated is located to be recessed obliquely leftward and forward so as to substantially follow the moving direction of the head portion MH of the occupant MP moving obliquely leftward and forward. In addition, in the airbag 15B, a rightward-leftward tether 73 for linking an intermediate area of the forward-rearward tether 41 and the right wall portion 22 with each other is also located inside the bag main body 16. According to the airbag 15B configured in this way, the restraining recess portion 35B is located to substantially follow the moving direction of the head portion MH of the occupant MP when the bag main body 16 is completely inflated. Therefore, the head portion MH of the occupant MP can smoothly enter the restraining recess portion 35B.

Figure 10:
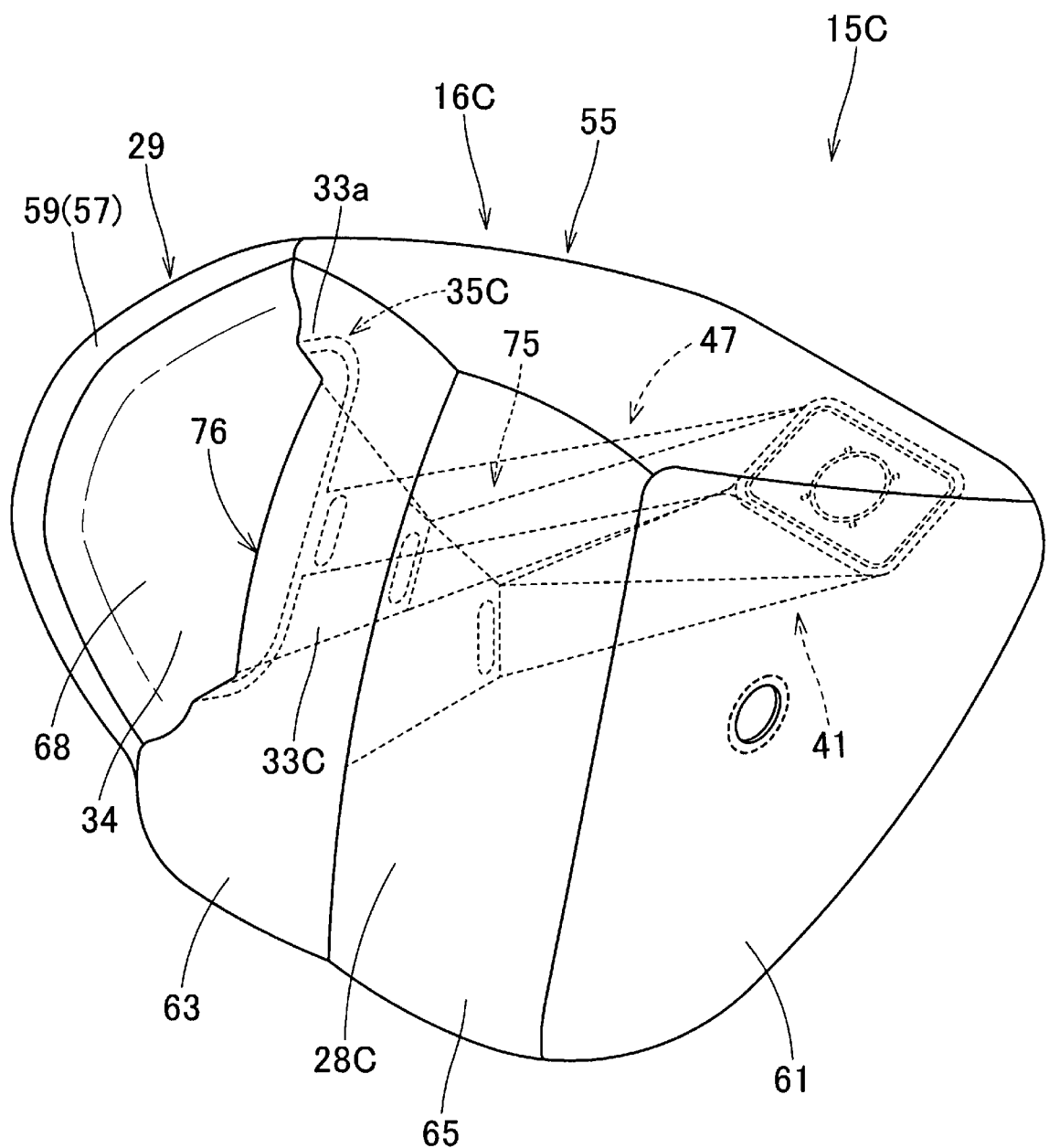
FIG. 10 is a perspective view when a state where an airbag according to still another embodiment of the present invention is inflated alone is viewed from an obliquely right rear side.
Figure 11:
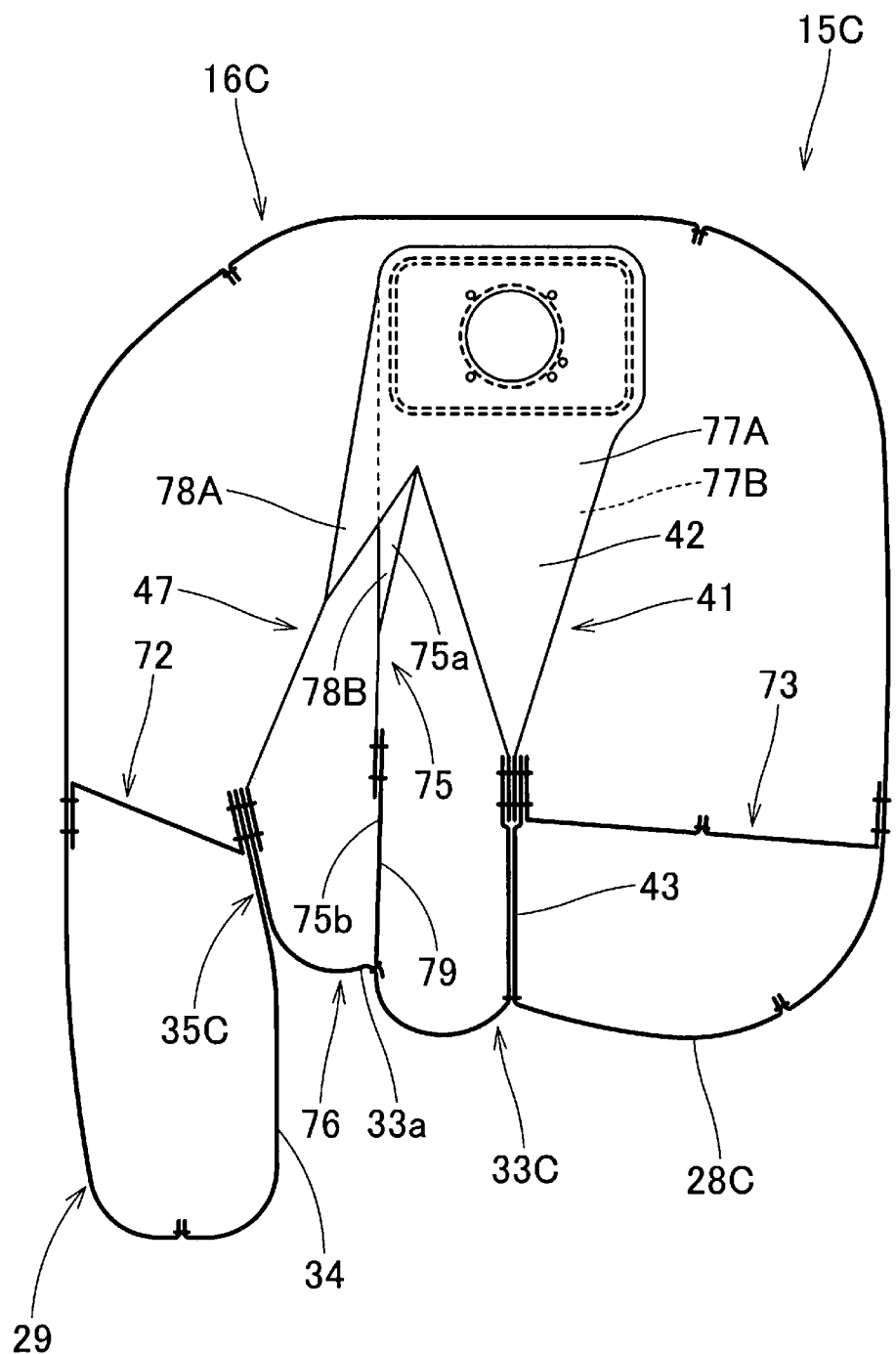
FIG. 11 is a schematic longitudinal sectional view of the airbag in FIG. 10.

Furthermore, a configuration for an airbag 15C may be adopted as follows. In addition to a recess portion tether 45, an auxiliary tether 75 is located so that a region adjacent to a rear end of a restraining recess portion 35C in a frontal collision restraint surface 33C is recessed forward to serve in an auxiliary manner. In the airbag 15C, as illustrated in FIGS. 10 and 11, an auxiliary recess portion 76 in which a left edge 33a side of the frontal collision restraint surface 33C is partially recessed forward is formed between the frontal collision restraint surface 33C and the restraining recess portion 35C when the bag main body 16C is completely inflated. In other words, the auxiliary recess portion 76 is formed to be continuous from the restraining recess portion 35C, and the rear end side of the restraining recess portion 35C is widely recessed in the rightward-leftward direction. In the embodiment, the width dimension of the auxiliary recess portion 76 on the side in the upward-downward direction is formed so as to substantially coincide with that of the restraining recess portion 35C (refer to FIG.

Figure 12:
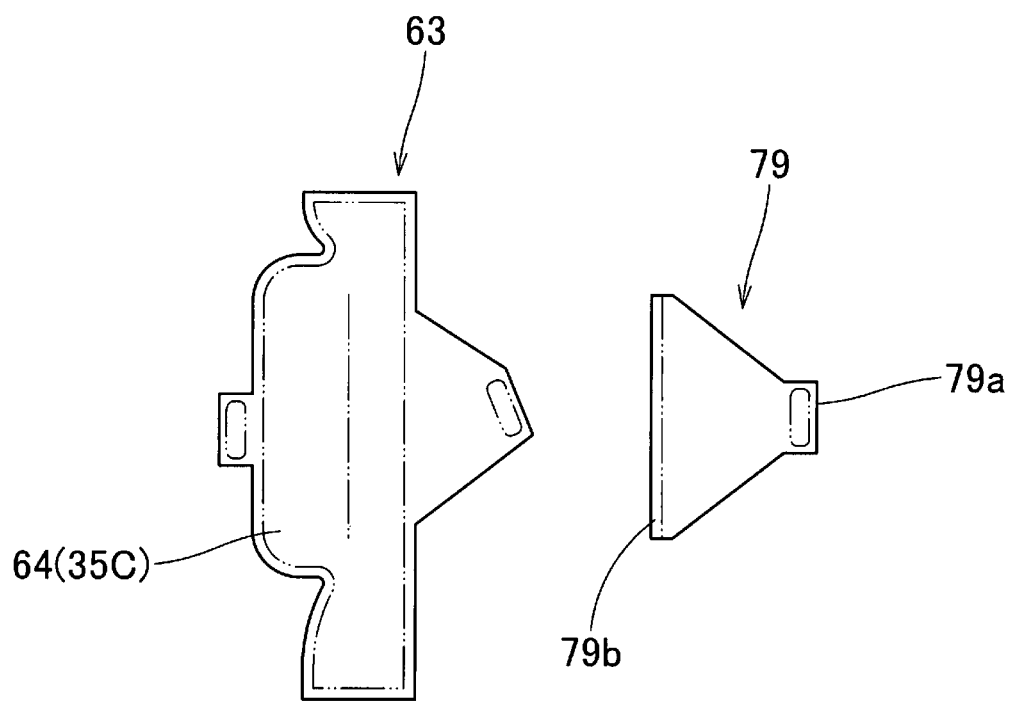
FIG. 12 is a plan view in which a rear panel and a rear side area configuration base material of an auxiliary tether configuring the airbag in FIG. 10 are aligned with each other.

10). The auxiliary tether 75 has a front side area 75*a* extending from the gas inlet 25 side and a rear side area 75*b* extending from a rear side wall portion 28C, and is configured so that end portions of the front side area 75*a* and the rear side area 75*b* are joined with each other. In the airbag 15C, tether base fabrics 77A and 77B having the same external shape as that of the tether base fabric 50 used for the airbag 15 are used in a two-layered manner. One belt-shaped portion 78A is used as the recess portion tether 45 by joining a rear end 78*b* to the tip side of the restraining recess portion 35C, and the other belt-shaped portion 78B is used as the front side area 75*a* of the auxiliary tether 75. That is, in the airbag 15C, the front side area 42 of the forward-rearward tether 41 is formed in a two-layered shape. As illustrated in FIG. 12, a rear side area configuration base material 79 configuring the rear side area 75*b* of the auxiliary tether 75 has a substantially trapezoidal shape in which a front end 79*a* side is narrowed and a rear end 79*b* side is widened. In the rear side area configuration base material 79, the width dimension on the side in the upward-downward direction on the rear end 79*b* side is slightly narrower than that of the restraining recess portion 35C (recess portion configuration portion 64 in the rear panel 63). Then, in the rear side area configuration base material 79, the rear end 79*b* is joined to the vicinity of the rear end of the recess portion configuration portion 64. When the airbag 15C is completely inflated, the left edge 33*a* side of the frontal collision restraint surface 33C is recessed over a wide range in the upward-downward direction. In this manner, the auxiliary recess portion 76 is formed. In addition, in the airbag 15C, similarly to the above-described airbag 15B, the auxiliary tether 72 and the rightward-leftward tether 73 are located inside the bag main body 16C.

If the airbag 15C is configured in this way, when the airbag 15C is completely inflated, the region on the frontal collision restraint surface 33C side in the rear end 35*b* of the restraining recess portion 35C can be partially recessed by the auxiliary tether 75. That is, the restraining recess portion 35C is located so that the rear end 35*b* side is open. According to this aspect, the head portion MH of the occupant MP can more smoothly enter the inside of the restraining recess portion 35C.

Figure 13:
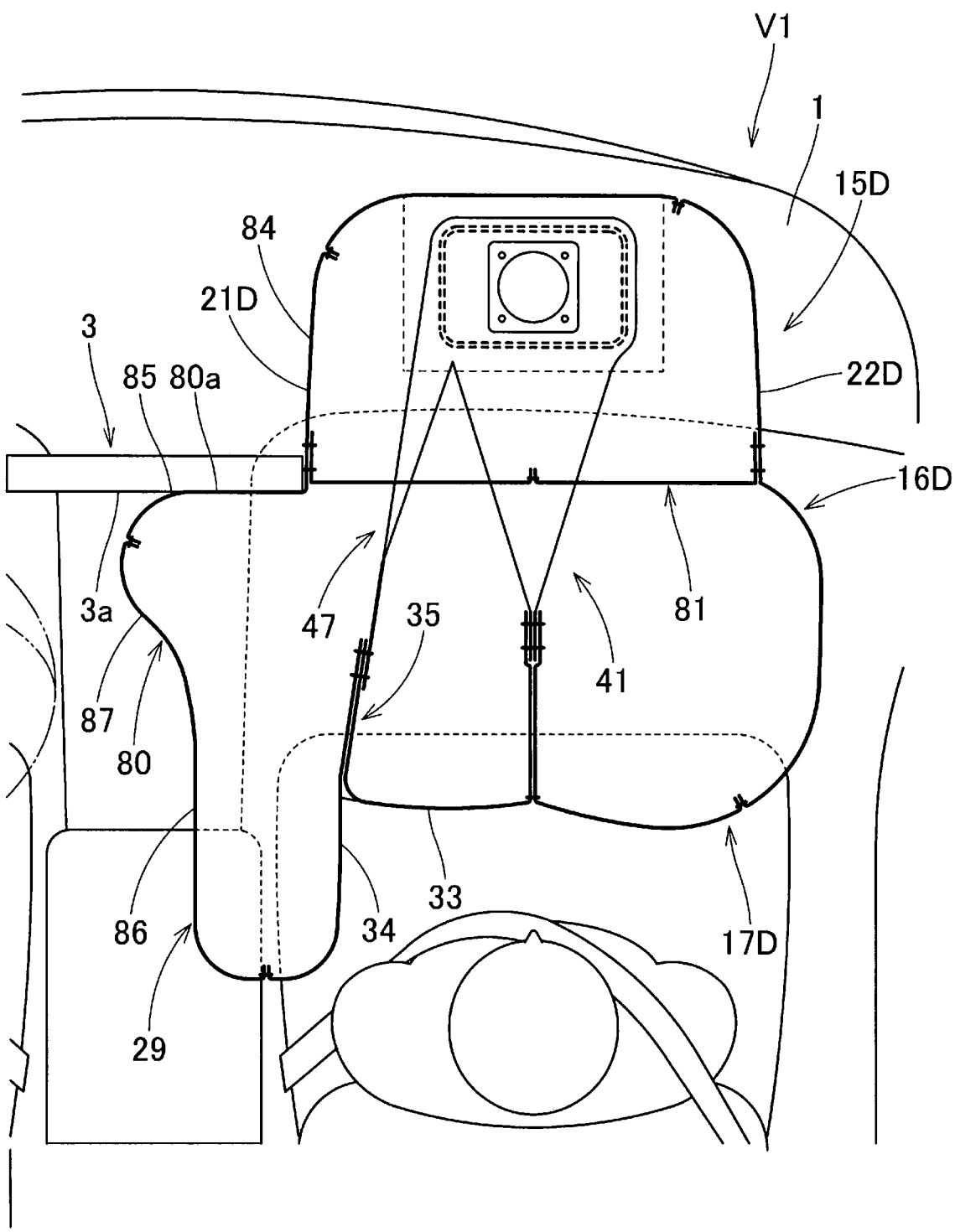
FIG. 13 is a schematic longitudinal sectional view illustrating a state where an airbag according to still another embodiment of the present invention is completely inflated in a front passenger seat airbag device using the airbag.

Furthermore, in a case where the airbag is mounted on a vehicle V1 in which a monitor 3 of a car navigation system as a projecting object is projected upward at the center of an instrument panel 1D in the rightward-leftward direction, a configuration for an airbag 15D may be adopted as follows. As illustrated in FIG. 13, a support inflation portion 80 which comes into contact with and supports a rear surface 3*a* side of the monitor 3 is partially projected in a main body inflation portion 17D. The support inflation portion 80 is located to partially project leftward from a left wall portion 21D in the main body inflation portion 17D, and is configured so that a completely inflated shape in a cross section on the side in the forward-rearward direction when completely inflated is thickened on the base portion side and is thinned on the tip side. In addition, the support inflation portion 80 is configured to be supported by the rear surface 3*a* of the monitor 3 so that a front surface 80*a* that projects when completely inflated substantially follows the rear surface 3*a* of the monitor 3. In addition, in the airbag 15D, in a region located on the right side of the monitor 3 in a bag main body 16D so as to be capable of bypassing the monitor 3, a rightward-leftward tether 81 for linking the left wall portion 21D and a right wall portion 22D with each other is located so as to be capable of regulating the width dimension on the side in the rightward-leftward direction when the airbag 15D is completely inflated.

Figure 14:
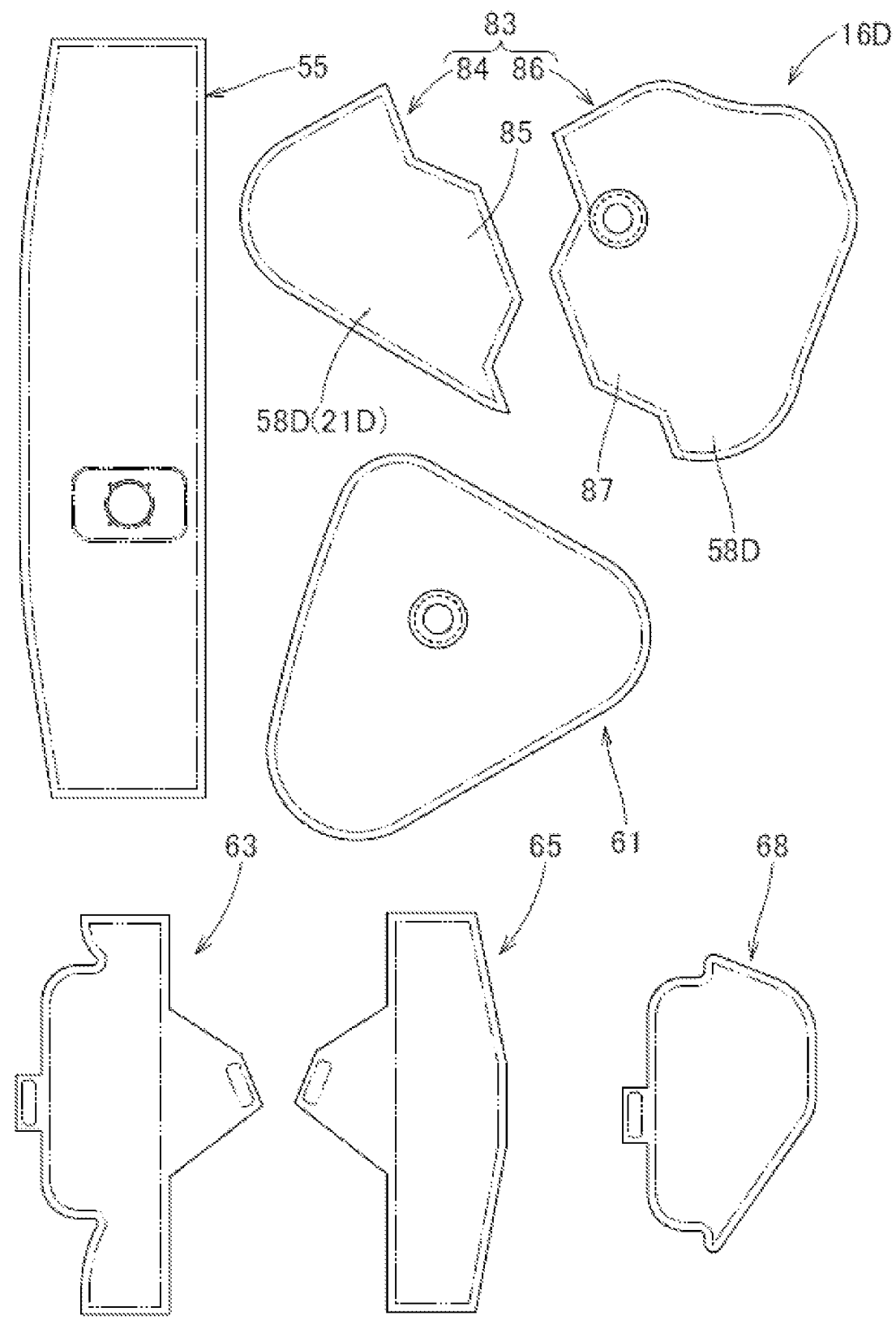
FIG. 14 is a plan view illustrating a base fabric configuring a bag main body in the airbag in FIG. 13.

The bag main body 16D in the airbag 15D is configured by the same base fabric as that of the bag main body 16 of the above-described airbag 15 except that a side wall configuration panel 83 configuring the left wall portion 21D is divided into two pieces on the side in the forward-rearward direction. That is, as illustrated in FIG. 14, the bag main body 16D is configured by seven base fabrics of the side wall configuration panel 83 formed from two pieces of a front divided body 84 and a rear divided body 86, the side wall configuration panel 61, the front panel 55, the rear panels 63 and 65, and the projecting portion configuration panel 68. The front divided body 84 and the rear divided body 86 which configure the side wall configuration panel 83 are configured to be divided in an area of a main body portion 58D configuring the left wall portion 21D. Support portion configuration portions 85 and 87 configuring the support inflation portion 80 are formed to project on the rear edge side of the front divided body 84 and the front edge side of the rear divided body 86. The support portion configuration portions 85 and 87 have the same external shape, and are formed in a flat trapezoidal shape. The side wall configuration panel 83 has substantially the same external shape as that of the side wall configuration panel 57 in the above-described airbag 15 in a state where the front divided body 84 and the rear divided body 86 are linked with each other so that the peripheral edges of the support portion configuration portions 85 and 87 are joined to each other.

If the airbag 15D is configured in this way, in a case where the airbag 15D is mounted on the vehicle V1 having the instrument panel 1D in which the projecting object such as the monitor 3 of the car navigation system is projected, the bag main body 16D is inflated so that the support inflation portion 80 is brought into contact with the rear surface 3*a* side of the monitor 3. In this manner, the airbag 15D when completely inflated can be supported by the monitor 3. In addition, the support inflation portion 80 can be easily formed as follows. The side wall configuration panel 83 configuring the region located on the left side which is the monitor 3 side when the airbag 15D is completely inflated is divided into two pieces of the front divided body 84 and the rear divided body 86 on the side in the rearward direction. The support inflation configuration portions 85 and 87 configuring the support inflation portion 80 are respectively located in each of the front divided body 84 and the rear divided body 86. In particular, in the airbag 15D, only the side wall configuration panel 83 has a different configuration, and the remaining side wall configuration panel 61, front panel 55, rear panels 63 and 65, and projecting portion configuration panel 68 have the same configuration as that of the above-described airbag 15. Therefore, the above-described airbag 15 is easily applicable to the airbag 15D.

Figure 15:
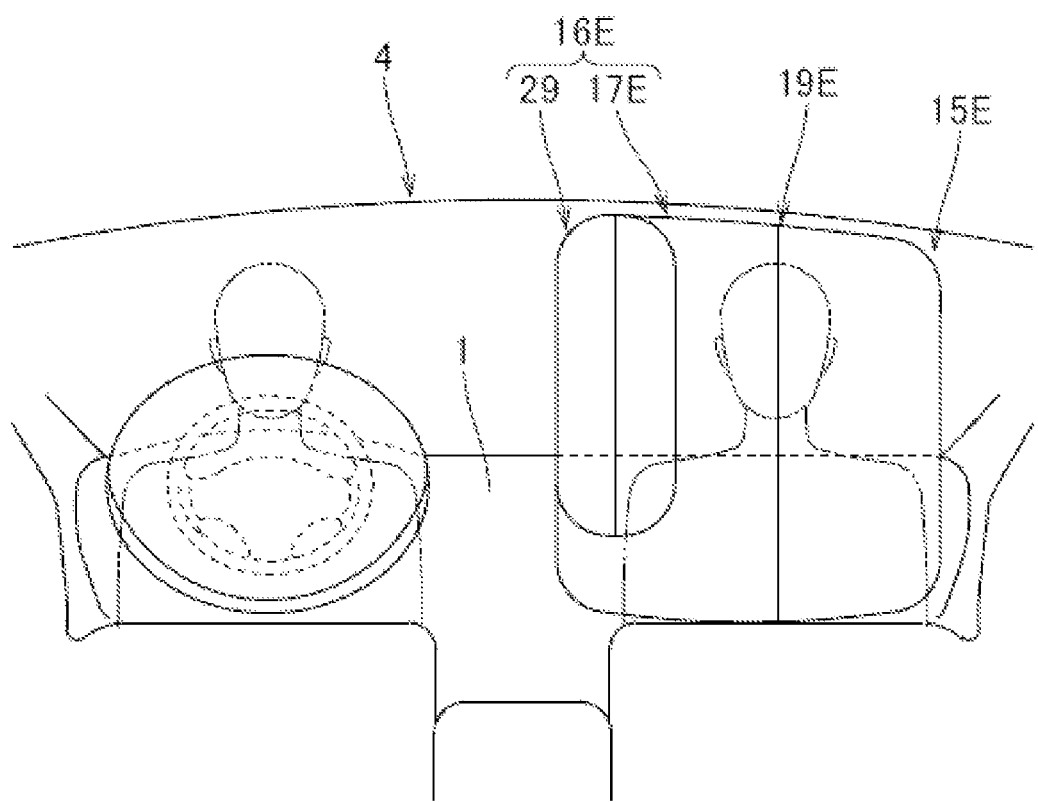
FIG. 15 is a front view when an airbag according to still another embodiment of the present invention is completely inflated in a front passenger seat airbag device using the airbag is viewed from a rear side of a vehicle.
Figure 16:
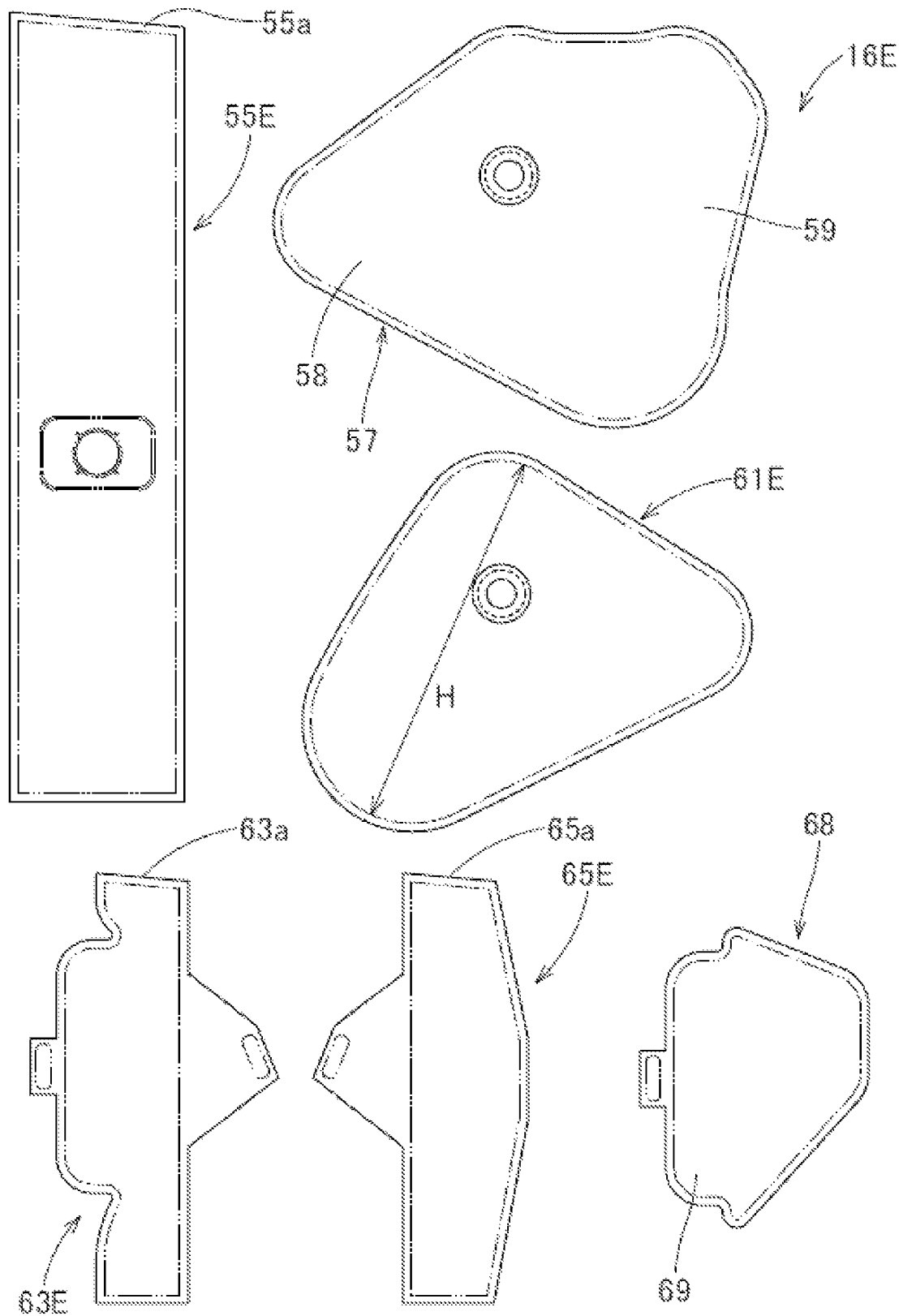
FIG. 16 is a plan view illustrating a base fabric configuring a bag main body in the airbag in FIG. 15.

In the vehicle V, a window shield 4 located above the instrument panel 1 is inclined to descend outward (right side in front of the front passenger seat PS) in the vehicle width direction in a state where the window shield 4 is viewed from the rear side of the vehicle (refer to FIG. 15). Then, a configuration for an airbag 15E may be adopted as follows. As illustrated in FIG. 15, an upper surface (upper wall portion 19E) that projects when completely inflated in a main body inflation portion 17E is aligned with a lower surface shape of the window shield 4. The upper surface (upper wall portion 19E) is inclined to descend from the center to the outside (from the left side to the right side) in the vehicle width direction. As illustrated in FIG. 16, a bag main body 16E in the airbag 15E is configured by a total of six base fabrics of a front panel 55E, side wall configuration panels 57 and 61E, rear panels 63E and 65E, and the projecting portion configuration panel 68. The front panel 55E has the same configuration as that of the above-described front panel 55 except that the rear upper edge 55a is inclined rightward and downward. In addition, the rear panels 63E and 65E also have the same configuration as that of the above-described rear panels 63 and 65 except that the upper edges 63a and 65a are inclined rightward and downward in accordance with the rear upper edge 55a of the front panel 55E. The side wall configuration panel 61E located rightward, which is outside in the vehicle width direction when completely inflated is set to have a smaller width dimension H on the side in the upward-downward direction, compared to the side wall configuration panel 57 located leftward. In the airbag 15E, the rear upper edge 55a and the upper edges 63a and 65a are inclined, and the width dimension on the side in the upward-downward direction of the side wall configuration panel 61E is set to be smaller. In this manner, an inclined state of the upper surface (upper wall portion 19E) when completely inflated is formed.

In the airbag 15E configured in this way, as illustrated in FIG. 15, the upper surface side (upper wall portion 19E) that projects when completely inflated is inclined rightward and downward in accordance with the window shield 4. In this manner, the window shield 4 is prevented from being strongly interfered with the inflated airbag 15E. Therefore, the airbag 15E can be completely inflated in a stable posture without any deformation. An inclined shape of the upper surface (upper wall portion 19E) can be easily formed as follows. The upper edges 63a and 65a of the respective rear panels 63E and 65E and the rear upper edge 55a of the front panel 55E joined to the upper edges 63a and 65a are respectively inclined. The width dimension on the side in the upward-downward direction of the side wall configuration panel 61E is set to be smaller.

What is claimed is:

1. A front passenger seat airbag device comprising:
an airbag folded and stored inside a storage area disposed in an instrument panel located in front of an occupant sitting on a front passenger seat, and inflated to project rearward in a vehicle by injecting inflating gas into the airbag,
wherein the airbag includes a main body inflation portion in which a front end side that projects when the airbag is completely inflated is attached to the storage area, and a projecting inflation portion located to partially project rearward from at least one end side in a rightward-leftward direction, on a rear surface side of the main body inflation portion that projects when the airbag is completely inflated, and a rear side region that projects when the airbag is completely inflated is configured to serve as an occupant protector capable of protecting the occupant,
wherein the occupant protector includes
a frontal collision restraint surface configured by a region on the rear surface side of the main body inflation portion that projects when the main body inflation portion is completely inflated, and configured to be capable of protecting a head portion of the occupant moving forward at a time of a frontal collision of the vehicle,
an oblique collision restraint surface configured by a side wall formed in the projecting inflation portion so as to be continuous from a rear surface of the main body inflation portion, and configured to be capable of protecting the head portion of the occupant moving obliquely forward at a time of an oblique collision or an offset collision of the vehicle, and
a restraining recess portion formed to be recessed forward in order to be configured to restrain the head portion of the occupant by allowing the head portion of the occupant to enter between the frontal collision restraint surface and the oblique collision restraint surface,
wherein the airbag is formed into a bag shape in such a way that peripheral edges of base materials formed of a flexible sheet body having a predetermined shape are joined to one another,
wherein the base material is configured by at least six pieces of two side wall configuration panels, a projecting portion configuration panel, a front panel, and two rear panels,
wherein each of the side wall configuration panels configures a left wall portion or a right wall portion facing each other on a side in the rightward-leftward direction in the main body inflation portion that projects when the airbag is completely inflated, and at least one of which is configured so that a projecting portion configuration portion configuring the projecting inflation portion is located by being partially extended rearward,
wherein the front panel configures an upper wall portion to a lower wall portion which face on a side in an upward-downward direction in the main body inflation portion that projects when the airbag is inflated, to include a front edge side area linking the upper wall portion and the lower wall portion with each other,
wherein each of the rear panels configures a rear surface in the main body inflation portion that projects when the airbag is inflated, and is configured to be divided into two pieces on the side in the rightward-leftward direction,
wherein the projecting portion configuration panel configures an oblique collision restraint surface side in the projecting inflation portion, and is configured to have an external shape substantially coincident with that of the projecting portion configuration portion formed in one of the side wall configuration panels,
wherein the projecting portion configuration panel and the rear panel located on a projecting inflation portion side include recess portion configuration portions configuring a facing surface of the restraining recess portion,
wherein the main body inflation portion is configured so that an upper surface that projects when the main body inflation portion is completely inflated is inclined to descend outward from a center in a vehicle width direction, in accordance with a lower surface shape on a side in the rightward-leftward direction of a window shield located above the instrument panel, and
wherein an inclined shape of the upper surface is formed by respectively inclining an upper edge of each of the rear panels and a rear upper edge of the front panel joined to the upper edge, and by setting a reduced width dimension on a side in the upward-downward direction of the side wall configuration panel located outward in the vehicle width direction when the airbag is completely inflated.

* * * * *